US012635030B2

(12) United States Patent
Lu et al.

(10) Patent No.: US 12,635,030 B2
(45) Date of Patent: May 19, 2026

(54) METHOD FOR PROCESSING DISCONTINUOUS RECEPTION PARAMETER, STORAGE MEDIUM, AND PROCESSOR

(71) Applicant: GUANGDONG OPPO MOBILE TELECOMMUNICATIONS CORP., LTD., Dongguan (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 403 days.

(21) Appl. No.: 17/863,651

(22) Filed: Jul. 13, 2022

(65) Prior Publication Data

US 2022/0346181 A1 Oct. 27, 2022

Related U.S. Application Data

(63) Continuation of application No. PCT/CN2021/071916, filed on Jan. 14, 2021.

(30) Foreign Application Priority Data

Jan. 21, 2020 (WO) ................ PCT/CN2020/073639

(51) Int. Cl.
*H04W 76/28* (2018.01)

(52) U.S. Cl.
CPC .................................. *H04W 76/28* (2018.02)

(58) Field of Classification Search
CPC . H04W 76/28; H04W 52/0216; H04W 72/20; H04W 92/18; H04W 4/06;
(Continued)

(56) References Cited

U.S. PATENT DOCUMENTS

| 2005/0195760 A1 | 9/2005 | Lee |
| 2009/0175186 A1 | 7/2009 | Du et al. |

(Continued)

FOREIGN PATENT DOCUMENTS

| CN | 102932882 A | 2/2013 |
| CN | 103945505 A | 7/2014 |

(Continued)

OTHER PUBLICATIONS

Examination report for European Application No. 21745164.0 Issued Feb. 20, 2024, 8 Pages.

(Continued)

*Primary Examiner* — Ayanah S George
(74) *Attorney, Agent, or Firm* — PERKINS COIE LLP

(57) ABSTRACT

The present disclosure discloses a method for processing discontinuous reception parameters, a storage medium and a processor. The method includes: user equipment receiving discontinuous reception parameters and parameter values, the discontinuous reception parameters corresponding to different communication parameters being different, or the parameter values of the discontinuous reception parameters corresponding to different communication parameters being different; and the user equipment performing configuration on the basis of the discontinuous reception parameters and the parameter values. The present disclosure solves the technical problems in the related art of being unable to achieve the purpose of power saving as user equipment has a large power consumption when transmitting data (such as a direct communication request (DCR) message or a discovery message) on a sidelink.

10 Claims, 5 Drawing Sheets

User equipment

Network device

S302, Send a discontinuous reception parameter and a parameter value

(58) Field of Classification Search
CPC ......... H04W 52/0258; H04W 52/0229; H04W
76/38; H04W 52/0212; H04W 4/40;
H04W 8/24; H04W 72/25; H04W 76/14;
H04W 88/06; Y02D 30/70
See application file for complete search history.

(56) References Cited

U.S. PATENT DOCUMENTS

| | | | |
|---|---|---|---|
| 2013/0308511 A1 | 11/2013 | Ljung | |
| 2017/0171907 A1* | 6/2017 | Agarwal | H04W 52/0219 |
| 2019/0223049 A1* | 7/2019 | Zhang | H04W 72/04 |
| 2020/0015312 A1* | 1/2020 | He | H04W 72/0446 |
| 2023/0014303 A1* | 1/2023 | Di Girolamo | H04W 76/28 |
| 2023/0062341 A1* | 3/2023 | Zhou | H04W 76/28 |

FOREIGN PATENT DOCUMENTS

| | | | |
|---|---|---|---|
| CN | 104219738 A | 12/2014 | |
| CN | 104581908 A | 4/2015 | |
| CN | 104322116 B | 5/2018 | |
| CN | 108307489 A | 7/2018 | |
| CN | 108377537 A | 8/2018 | |
| CN | 108616897 A | 10/2018 | |
| CN | 108712773 A | 10/2018 | |
| CN | 110572842 A | 12/2019 | |
| EP | 3499975 A1 | 6/2019 | |
| EP | 3557940 A1 | 10/2019 | |
| JP | 2017528064 A | 9/2017 | |
| WO | 2018064477 A1 | 4/2018 | |
| WO | 2018112850 A1 | 6/2018 | |

OTHER PUBLICATIONS

First Office Action of the CN application No. 202210786536. 5,issued on Jul. 4, 2023. 21 pages with English translation.
Search Report of the EP application No. 21745164.0, issued on May 9, 2023. 11pages.

Written Opinion of the International Searching Authority (ISA237) of PCT PCT/CN2020/073639, issued on Oct. 23, 2020. 8 pages with English translation.
Intel Corporation, Remaining Issues on DRX Alignment in Dual Connectivity. 3GPP TSG RAN WG2 Meeting #87 Dresden, Germany, Aug. 18-22, 2014, R2-143191. 4pages.
Notification of grant of patent right for invention of the Chinese application No. 202210786536.5, issued on Sep. 6, 2023. 6 pages with English translation.
First Office Action of the Canadian application No. 3,165,193, issued on Aug. 22, 2023. 3 pages.
First Office Action of the IN application No. 202217046540, issued on Oct. 30, 2023. 7 pages.
International Search Report Mailed Apr. 15, 2021, in International Application No. PCT/CN2021/071916.
Written Opinion Mailed Apr. 15, 2021 in Application No. PCT/CN2021/071916.
International Search Report Mailed Oct. 23, 2020 in Application No. PCT/CN2020/073639.
LG Electronics, New WID on NR sidelink enhancement, 3GPP TSG RAN Meeting #86 , RP-193231, Sitges, Spain, Dec. 9-12, 2019, 6 pages.
Second Examiners Report for Canadian Application No. 3165193 issued Jun. 7, 2024. 3 pages.
Second examination report for European Patent Application No. 21745164.0. Mail Date: Jul. 31, 2024. 8 pages.
Office Action dated Oct. 11, 2024 for Japanese Patent Application No. 2022-543182 and English Translation. 11 pages.
Office Action dated Dec. 23, 2024 for EP Patent Application No. 21745164.0. 9 pages.
Hearing Notice of the Indian application No. 202217046540, issued on Feb. 6, 2025. 3 pages.
Examination report No. 1 of the Australian application No. 2021210440, issued on May 30, 2025. 3 pages.
Examination report No. 2 of the Australian application No. 2021210440, issued on Jul. 23, 2025. 4 pages.
Examination report of the European application No. 21745164.0, issued on Jun. 16, 2025. 9 pages.
Office Action dated Mar. 6, 2026 for Korean Patent Application No. 10-2022-7027500 and English Translation, 22 pages.

* cited by examiner

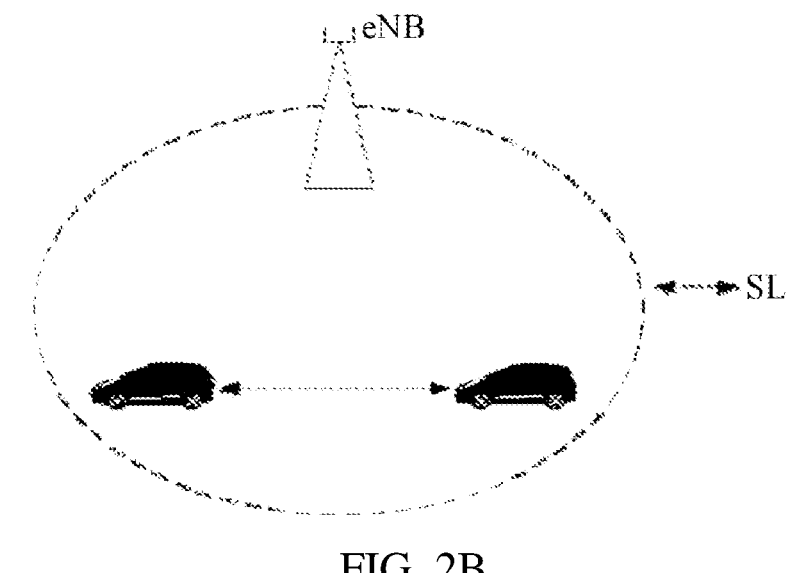
FIG. 2B
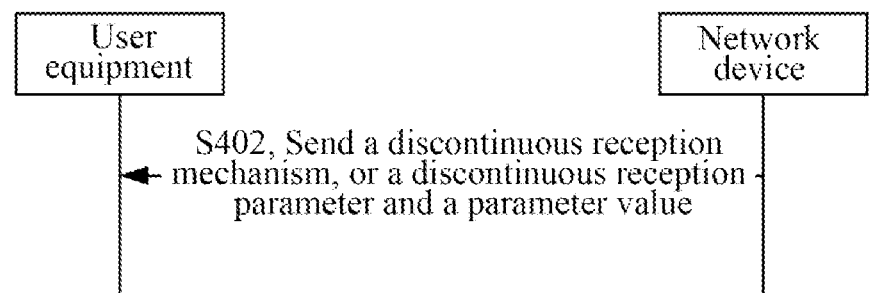
FIG. 3
FIG. 4

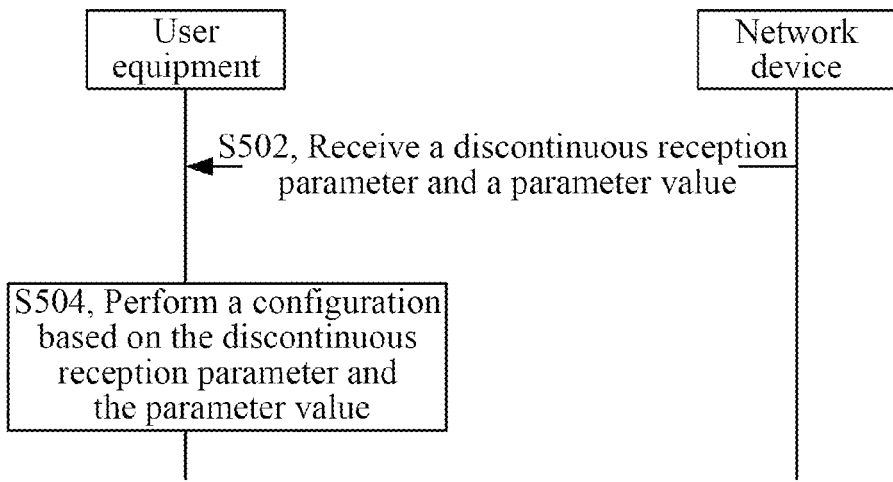
FIG. 5
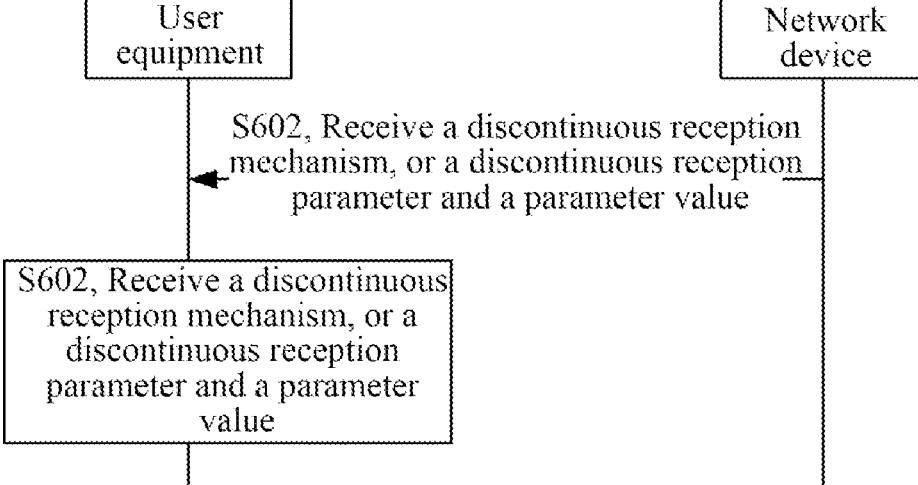
FIG. 6
Network device 700
Communication
module 702
FIG. 7

METHOD FOR PROCESSING DISCONTINUOUS RECEPTION PARAMETER, STORAGE MEDIUM, AND PROCESSOR

CROSS-REFERENCE TO RELATED APPLICATION

The present application is a continuation application of International PCT Application No. PCT/CN2021/071916, filed on Jan. 14, 2021, which claims priority to International PCT Application No. PCT/CN2020/073639, filed on Jan. 21, 2020. The present application claims priorities and benefits of the above-identified applications, and the above-identified applications are incorporated by reference herein in their entireties.

TECHNICAL FIELD

The present disclosure relates to the field of communication, in particular to a method for processing a discontinuous reception parameter, a storage medium, and a processor.

BACKGROUND

At present, in a Proximity Based Service (ProSe), by configuring a position of a resource pool in a time domain, for example, the resource pool is discontinuous in the time domain, so that a User Equipment (UE) may transmit/receive data discontinuously on a sidelink, thereby achieving an effect of saving power.

However, in Vehicle-to-Everything (V2X) or New Radio (NR) V2X, since a vehicle-mounted system has continuous power supply, a terminal device is required to perform transmitting and receiving continuously in a system design, which leads to a large power consumption of a sidelink, and a purpose of saving power cannot be achieved.

In view of the above problem, no effective solution has been put forward at present.

SUMMARY

Implementations of the present disclosure provide a method for processing a discontinuous reception parameter, a storage medium, and a processor.

According to a first aspect of an implementation of the present disclosure, a method for processing a discontinuous reception parameter is provided, including: sending a discontinuous reception parameter and a parameter value to a user equipment; wherein discontinuous reception parameters corresponding to different communication parameters are different, or values of discontinuous reception parameters corresponding to different communication parameters are different.

According to a second aspect of an implementation of the present disclosure, a method for processing a discontinuous reception parameter is provided, including: sending a discontinuous reception mechanism, or a discontinuous reception parameter and a parameter value, to a user equipment; wherein discontinuous reception mechanisms or discontinuous reception parameters corresponding to different specific messages are different, or values of discontinuous reception parameters corresponding to different specific messages are different.

According to a third aspect of an implementation of the present disclosure, a method for processing a discontinuous reception parameter is provided, including: receiving, by a user equipment, a discontinuous reception parameter and a parameter value, wherein discontinuous reception parameters corresponding to different communication parameters are different, or values of discontinuous reception parameters corresponding to different communication parameters are different; and performing, by the user equipment, a configuration based on the discontinuous reception parameter and the parameter value.

According to a fourth aspect of an implementation of the present disclosure, a method for processing a discontinuous reception parameter is provided, including: receiving, by a user equipment, a discontinuous reception mechanism, or a discontinuous reception parameter and a parameter value, wherein, discontinuous reception mechanisms or discontinuous reception parameters corresponding to different specific messages are different, or values of discontinuous reception parameters corresponding to different specific messages are different; and performing, by the user equipment, a configuration based on the discontinuous reception mechanism, or the discontinuous reception parameter and the parameter value.

According to a fifth aspect of an implementation of the present disclosure, a network device is provided, including: a communication module configured to sending a discontinuous reception parameter and a parameter value to a user equipment; wherein discontinuous reception parameters corresponding to different communication parameters are different, or values of discontinuous reception parameters corresponding to different communication parameters are different.

According to a sixth aspect of an implementation of the present disclosure, a network device is provided, including: a communication module configured to sending a discontinuous reception mechanism, or a discontinuous reception parameter and a parameter value, to a user equipment; wherein discontinuous reception mechanisms or discontinuous reception parameters corresponding to different specific messages are different, or values of discontinuous reception parameters corresponding to different specific messages are different.

According to a seventh aspect of an implementation of the present disclosure, a user equipment is provided, including: a communication module configured to receive a discontinuous reception parameter and a parameter value, wherein discontinuous reception parameters corresponding to different communication parameters are different, or values of discontinuous reception parameters corresponding to different communication parameters are different; and a processing module configured to perform a configuration based on the discontinuous reception parameter and the parameter value.

According to an eighth aspect of an implementation of the present disclosure, a user equipment is provided, including: a communication module configured to receive a discontinuous reception mechanism, or a discontinuous reception parameter and a parameter value, wherein discontinuous reception mechanisms or discontinuous reception parameters corresponding to different specific messages are different, or values of discontinuous reception parameters corresponding to different specific messages are different; and a processing module configured to perform a configuration based on the discontinuous reception mechanism, or the discontinuous reception parameter and the parameter value.

According to a ninth aspect of an implementation of the present disclosure, a storage medium is provided, the storage medium includes a stored program, wherein a device where the storage medium is located is controlled to perform the method for processing a discontinuous reception parameter in any of the first to fourth aspects when the program is running According to a tenth aspect of an implementation of the present disclosure, a processor is provided, the processor is configured to run a program, wherein when the program is running, the method for processing a discontinuous reception parameter in any of the first to fourth aspects is performed.

BRIEF DESCRIPTION OF DRAWINGS

Accompanying drawings described herein are intended to provide further understanding of the present disclosure, and constitute a part of the present disclosure. Exemplary implementations of the present disclosure and descriptions thereof are intended to explain the present disclosure, but do not constitute a limitation to the present disclosure.

FIG. 2B is a schematic diagram of a D2D communication system under mode B to which an implementation of the present disclosure is applied.

FIG. 3 is a flowchart of a first method for processing a discontinuous reception parameter according to an implementation of the present disclosure.

FIG. 4 is a flowchart of a second method for processing a discontinuous reception parameter according to an implementation of the present disclosure.

FIG. 5 is a flowchart of a third method for processing a discontinuous reception parameter according to an implementation of the present disclosure.

FIG. 6 is a flowchart of a fourth method for processing a discontinuous reception parameter according to an implementation of the present disclosure.

FIG. 7 is a schematic diagram of a network device according to an implementation of the present disclosure.

DETAILED DESCRIPTION

To enable one skilled in the art to better understand solutions of the present disclosure, technical solutions in implementations of the present disclosure will be described clearly and completely below with reference to drawings in the implementations of the present disclosure. Apparently, the described implementations are only part, but not all, of the implementations of the present disclosure. According to the implementations of the present disclosure, all other implementations acquired by a person having ordinary skill in the art without paying an inventive effort are within the protection scope of the present disclosure.

It should be noted that terms "first", "second", or the like in the specification, claims, and drawings of the present disclosure are used for distinguishing similar objects, but are not necessarily used for describing a particular order or precedence. It should be understood that data used in this way may be interchanged under appropriate circumstances such that the implementations of the present disclosure described herein can be implemented in orders other than those illustrated or described herein. In addition, terms "including", "having", and any variations of them, are intended to cover non-exclusive inclusion, for example, processes, methods, systems, products, or devices that include a series of acts or units need not be limited to those clearly listed, but may include other acts or units that are not clearly listed or inherent to these processes, methods, products, or devices.

The technical solutions in the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunications System (UMTS), a Worldwide Interoperability for Microwave Access (WiMAX) communication system, or a 5G system, etc.

Figure 1:
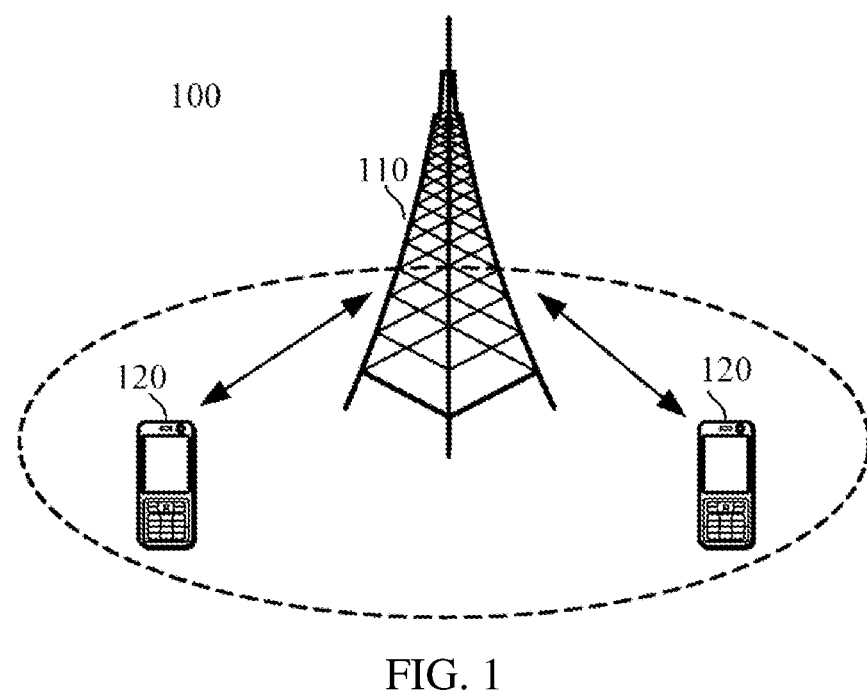
FIG. 1 is a schematic diagram of a communication system to which an implementation of the present disclosure is applied.

Illustratively, a communication system 100 to which an implementation of the present disclosure is applied is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage range of the network device 110. The "terminal device" as used herein includes, but is not limited to, an apparatus configured to receive/send communication signals via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting Handheld (DVB-H) network, a satellite network, and an Amplitude Modulation-Frequency Modulation (AM-FM) broadcast transmitter; and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but are not limited to, a satellite or cellular phone; a Personal Communication System (PCS) terminal that may combine a cellular radio phone with data processing, facsimile, and data communication abilities; a PDA that may include a radio phone, a pager, internet/intranet access, a Web browser, a memo pad, a calendar, and/or a Global Positioning System (GPS) receiver; and a conventional laptop and/or palmtop receiver, or another electronic apparatus including a radio phone transceiver. The terminal device may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, Device to Device (D2D) communication may be performed between the terminal devices 120.

Optionally, a 5G system or 5G network may be referred to as a New Radio (NR) system or an NR network.

FIG. 1 illustrates one network device and two terminal devices. Optionally, the communication system 100 may include multiple network devices, and other quantity of terminal devices may be included within the coverage area of each network device, which is not limited in the implementations of the present disclosure.

Optionally, the communication system 100 may also include another network entity, such as a network controller, a mobile management entity, etc., which is not limited in the implementations of the present disclosure.

It should be understood that a device with a communication function in a network/system in the implementations of the present disclosure may also be referred to as a communication device. Taking the communication system 100 shown in FIG. 1 as an example, a communication device may include a network device 110 and terminal devices 120 which have communication functions, and the network device 110 and the terminal devices 120 may be the specific devices described above, and will not be described repeatedly herein. The communication devices may also include other devices in the communication system 100, for example other network entities, such as network controllers and mobile management entities, which is not limited in the implementations of the present disclosure.

It should be understood that the terms "system" and "network" are often used interchangeably herein. The term "and/or" herein refers to an association relationship describing associated objects only, which indicates that three kinds of relationships may exist, for example, A and/or B may indicate three cases: A alone, both A and B at the same time, and B alone. In addition, the symbol "/" herein generally indicates that objects before and after the symbol "/" have an "or" relationship.

D2D communication is a Sidelink (SL) transmission technology based on D2D, different from a traditional cellular system in which communication data is received or sent through a base station, a V2X system uses a mode of terminal-to-terminal direct communication, and therefore has higher spectrum efficiency and lower transmission delay. Two transmission modes are defined in the 3rd Generation Partnership Project (3GPP): mode A and mode B, as shown in FIGS. 2A and 2B, wherein a solid line shows a sidelink and a dashed line shows a Downlink (DL).

Figure 2A:
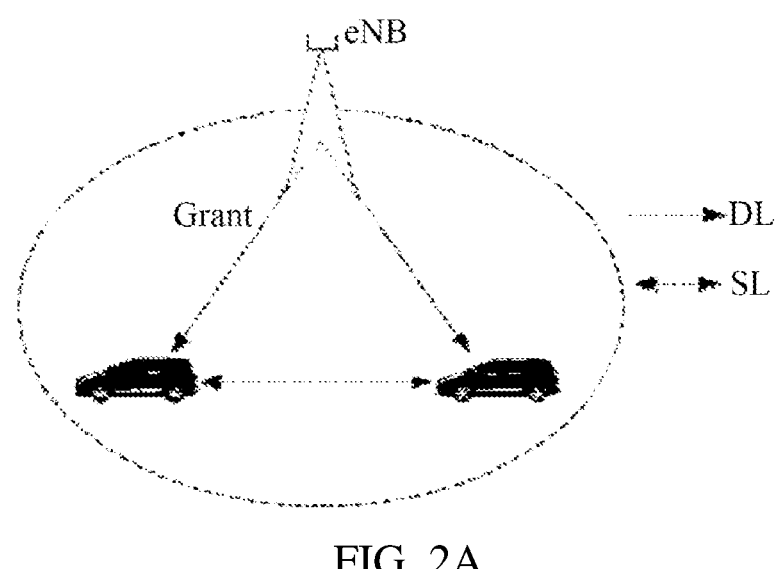
FIG. 2A is a schematic diagram of a Device to Device (D2D) communication system under mode A to which an implementation of the present disclosure is applied.

As shown in FIG. 2A, in the mode A, a transmission resource of a terminal is allocated by a base station, the base station allocates the resource to the terminal based on a Grant signaling (Grant) through a downlink, and the terminal transmits data on a sidelink according to the resource allocated by the base station; the base station may allocate to the terminal a resource for one-time transmission or a resource for semi-static transmission. In the mode B shown in FIG. 2B, a vehicle-mounted terminal selects a resource in a resource pool for data transmission.

In the 3GPP, D2D is studied in different stages. ProSe: in Release-12/13 (Rel-12/13), Device-to-Device communication has been studied for a ProSe scenario, which mainly aims at public safety services.

In the ProSe, by configuring a position of a resource pool in a time domain, for example, the resource pool is discontinuous in the time domain, so that a UE may transmit/receive data discontinuously on a sidelink, thereby achieving an effect of saving power.

V2X: in Rel-14/15, a V2X system has been studied for a scenario of Vehicle to Vehicle communication, which is mainly for services of relatively high-speed mobile vehicle-vehicle and vehicle-person communication.

In the V2X, power efficiency is not a main problem since a vehicle-mounted system has continuous power supply, but delay of data transmission is the main problem, so a terminal device is required to perform transmitting and receiving continuously in a system design.

Further Enhancements to LTE Device to Device (FeD2D): in Rel-14, this scenario in which a FeD2D is connected to a network through a mobile phone has been studied, which is mainly for a scenario of a low mobile speed and a low power access.

In the FeD2D, a conclusion of the 3GPP is that a base station may configure a Discontinuous Reception (DRX) parameter of a remote terminal through a relay terminal in a pre-research stage. However, since this subject has not further entered a standardization stage, there is no conclusion on specific details of how to perform a DRX configuration.

On a basis of LTE V2X, NR V2X is not limited to a broadcast scenario, but is further extended to unicast and multicast scenarios, and an application of V2X is studied in these scenarios.

Similar to LTE V2X, the above two resource authorization modes of mode-A/B will also be defined for NR V2X. Furthermore, a user may be in a mixed mode, that is, the mode-A may be used for resource acquisition and the mode-B may be used for resource acquisition at the same time.

Unlike LTE V2X, in addition to Hybrid Automatic Repeat ReQuest (HARQ) retransmission without feedback and initiated by a UE, feedback-based HARQ retransmission is introduced in NR V2X, which is not limited to unicast communication, but also includes multicast communication.

Like LTE V2X, in NR V2X, power efficiency is not a main problem since a vehicle-mounted system has continuous power supply, but delay of data transmission is the main problem, so a terminal device is required to perform sending and receiving continuously in a system design.

On a basis of the above-mentioned related technologies, how to design a power-saving mechanism of a sidelink in order to solve a power-saving problem in a case of coexistence of different scenarios is a problem that needs to be solved at present.

A main problem of how to design the power saving mechanism of the sidelink is that, for a same UE, the UE also has power saving requirements for different requirements: power saving requirements under different transmission modes, such as broadcast, multicast, and unicast; power saving requirements under different services; power saving requirements under Different Radio Access Technologies (RATs); and power saving requirements under different interfaces, including Uu (User Equipment) and PC5.

Therefore, an implementation of the present disclosure provides a method for processing a discontinuous reception parameter.

FIG. 3 is a schematic flowchart of a first method for processing a discontinuous reception parameter according to an implementation of the present disclosure. The method may be performed by a network device.

As shown in FIG. 3, the method includes an act S302.

In act S302, a discontinuous reception parameter and a parameter value are sent to a user equipment.

Discontinuous reception parameters corresponding to different communication parameters are different, or values of discontinuous reception parameters corresponding to different communication parameters are different.

In the above implementation of the present disclosure, a communication parameter includes at least one of following: a transmission mode, a service type, a Radio Access Technology type, an interface type, and a carrier frequency. In this implementation, a device performing the above act S302 may be a network device, which may be the network device as shown in FIG. 1, and may transmit the DRX parameter and the parameter value to the user equipment. Data may be transmitted between UEs through a sidelink, and the UEs may be terminal devices as shown in FIG. 1. For a same UE, communication parameters used by the UE are different for different requirements. In order to meet power saving requirements under different requirements, different DRX parameters may be set for different communication parameters, or a same DRX parameter may be set for different communication parameters, but values of the DRX parameter are different.

After receiving the DRX parameter and parameter value, the UE may perform a configuration based on the received DRX parameter and parameter value, so that the UE discontinuously transmits/receives data on a sidelink, thereby achieving an effect of saving power. For example, the UE discontinuously sends/receives a PC5-S signaling, such as a Direct Communication Request (DCR) message, on a sidelink. For another example, the UE discontinuously sends/receives a discovery message on a sidelink.

According to a solution provided by the above implementation of the present disclosure, by sending a discontinuous reception parameter and a parameter value to the user equipment, the user equipment may perform a configuration based on the received discontinuous reception parameter and parameter value, wherein, discontinuous reception parameters corresponding to different communication parameters are different, or values of discontinuous reception parameters corresponding to different communication parameters are different. Compared with related technologies, for different requirements of a UE, different DRX parameters or parameter values may be set, so that the UE may transmit/receive data discontinuously in a case of coexistence of different scenarios, thereby achieving an effect of power saving, and solving a technical problem that a user equipment transmits data (such as a Direct Communication Request (DCR) message or a discovery message) on a sidelink in the related technologies, which consumes a large amount of power and cannot achieve a purpose of power saving.

In a first optional implementation, for power saving mechanisms under different transmission modes, for different transmission modes (broadcast, multicast, and unicast), different DRX parameters, or a same DRX parameter but different DRX parameter values, may be used.

A discontinuous reception parameter includes at least one of following: a discontinuous reception period, a time offset, a length of discontinuous reception on-duration (ondurationtimer), a length of a discontinuous reception activity timer (inactivitytimer), and a time length of a retransmission timer (retransmissiontimer).

In this implementation, in a case that a transmission mode is a first mode, it is determined to use a first discontinuous reception parameter; in a case that the transmission mode is a second mode, it is determined to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for a broadcast mode, a time offset is used for a multicast mode, and a DRX on-duration length is used for a unicast mode.

A DRX period is used for both a broadcast mode and a multicast mode, but parameter values of the DRX period are different. A DRX on-duration length is used for a unicast mode.

A DRX period and a time offset are used for a broadcast mode, a time offset and a DRX activity timer are used for a multicast mode, and a DRX on-duration length and a time length of a retransmission timer are used for a unicast mode.

A DRX period and a time offset are used for both a broadcast mode and a multicast mode, but parameter values of the DRX period are different, and parameter values of the time offset are also different. A DRX on-duration length is used for a unicast mode.

A discontinuous reception parameter is sent through at least one of following signaling: a Radio Resource Control (RRC) signaling, a System Information Block (SIB) message, and a pre-configuration signaling.

In a second optional implementation, for power saving mechanisms of different service types, for different services/service types, different DRX parameters, or a same DRX parameter but different DRX parameter values, may be used.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer).

In this implementation, in a case that a service type is a first type, it is determined to use a first discontinuous reception parameter; in a case that the service type is a second type, it is determined to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for the first type, and a time offset is used for the second type.

A DRX period is used for both the first type and the second type, but parameter values of the DRX period are different.

A DRX period and a time offset are used for the first type, and a time offset and a DRX activity timer are used for the second type.

A DRX period and a time offset are used for both the first type and the second type, but parameter values of the DRX period are different and parameter values of the time offset are also different.

A discontinuous reception parameter is sent through at least one of following signaling: an RRC signaling, a SIB message, and a pre-configuration signaling.

In an implementation of the present disclosure, a service type is determined based on a source address, a logical channel identifier, a target address, a Provider Service Identifier (PSID), an Intelligent Transportation Systems Application Identifier (ITSAID), a service priority, a PC5 5G Quality of Service (QoS) Identifier (PC5QI, PQI), a PC5 QoS Flow Identifier (PFI), and/or a QoS attribute identifier. That is, different service types may be determined according to different target addresses, PSIDs, ITSAIDs, service priorities, PQIs, PFIs, and QoS attribute identifiers, etc. Optionally, for a PC5-S message, such as a Direct Communication Request (DCR) message, a PC5 5G Quality of Service Identifier, a PC5 Quality of Service Flow Identifier, and/or a Quality of Service attribute identifier may be determined according to a QoS set corresponding to a set of services carried on a unicast link associated with the PC5-S message. The PC5-S message is a sidelink message based on a PC5 interface.

In another optional implementation, for power saving mechanisms under different service types, for different service types, different DRX parameters, or a same DRX parameter but different DRX parameter values, may be used. A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer).

In this implementation, the user equipment performs the configuration based on the discontinuous reception parameter and the parameter value, including: it is determined to use a first discontinuous reception parameter in a case that a service type is a first type; the user equipment determines to use a second discontinuous reception parameter in a case that the service type does not include the first type and includes a second type. Wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for the first type, and a time offset is used for the second type.

A DRX period is used for both the first type and the second type, but parameter values of the DRX period are different.

A DRX period and a time offset are used for the first type, and a time offset and a DRX activity timer are used for the second type.

A DRX period and a time offset are used for both the first type and the second type, but parameter values of the DRX period are different and parameter values of the time offset are also different.

A discontinuous reception parameter is received through at least one of following signaling: an RRC signaling, a SIB message, and a pre-configuration signaling.

In an implementation of the present disclosure, a service type is determined based on a source address, a logical channel identifier, a target address, a Provider Service Identifier (PSID), an Intelligent Transportation Systems Application Identifier (ITSAID), a service priority, a PC5 5G Quality of Service (QoS) Identifier (PC5QI, PQI), a PC5 QoS Flow Identifier (PFI), and/or a QoS attribute identifier. That is, different service types may be determined according to different target addresses, PSIDs, ITSAIDs, service priorities, PQIs, PFIs, and QoS attribute identifiers, etc. Optionally, for a PC5-S message, such as a Direct Communication Request (DCR) message, a PC5 5G Quality of Service Identifier, a PC5 Quality of Service Flow Identifier, and/or a Quality of Service attribute identifier may be determined according to a QoS set corresponding to a set of services carried on a unicast link associated with the PC5-S message. The PC5-S message is a sidelink message based on a PC5 interface.

In another optional implementation, the service type refers to a service type associated with a service carried on a unicast communication link.

In a third optional implementation, for power saving mechanisms of different RAT types, for different RAT types, different DRX parameters, or a same DRX parameter but different DRX parameter values, may be used.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer).

In this implementation, in a case that a RAT type is a first type, it is determined to use a first discontinuous reception parameter; in a case that the RAT type is a second type, it is determined to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for LTE and a time offset is used for NR.

A DRX period is used for both LTE and NR, but parameter values of the DRX period are different.

A DRX period and a time offset are used for LTE, and a time offset and a DRX activity timer are used for NR.

A DRX period and a time offset are used for both LTE and NR, but parameter values of the DRX period are different and parameter values of the time offset are also different.

A discontinuous reception parameter is sent through at least one of following signaling: an RRC signaling, a SIB message, and a pre-configuration signaling.

A RAT type includes: LTE and NR, or different releases of LTE/NR.

In a fourth optional implementation, for power saving mechanisms under different interface types, for different interface types, different DRX parameters, or a same DRX parameter but different DRX parameter values, may be used.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer).

In this implementation, in a case that an interface type is a first type, it is determined to use a first discontinuous reception parameter; in a case that the interface type is a second type, it is determined to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for a Uu interface and a time offset is used for a PC5 interface.

A DRX period is used for both a Uu interface and a PC5 interface, but parameter values for the DRX period are different.

A DRX period and a time offset are used for a Uu interface, and a time offset and a DRX activity timer are used for a PC5 interface.

A DRX period and a time offset are used for both a Uu interface and a PC5 interface, but parameter values of the DRX period are different and parameter values of the time offset are also different.

A discontinuous reception parameter is sent through at least one of following signaling: an RRC signaling, a SIB message, and a pre-configuration signaling.

An interface type includes: a Uu interface and a PC5 interface.

For different interface types, different DRX parameters, or a same DRX parameter but different DRX parameter values, are used, including:

a first parameter reported by a user equipment is received, wherein, the first parameter is used for determining a value of a discontinuous reception parameter corresponding to a PC5 interface. That is, a UE reports a first parameter to a network, the first parameter is input information for calculating a PC5 DRX parameter value, and the calculated PC5 DRX parameter value is returned to the UE.

The first parameter includes at least one piece of following information of the UE: identity information of the UE, transmission mode information, source address information, PQI, PFI, and QoS attribute information, etc.

A value of a discontinuous reception parameter corresponding to a user equipment interface is sent to the user equipment, wherein the user equipment is used for determining a value of a discontinuous reception parameter corresponding to a PC5 interface based on the value of the discontinuous reception parameter corresponding to the user equipment interface. That is, a network delivers only a first DRX parameter value used by a Uu, and a UE deduces a second DRX parameter value used by a PC5 according to the first DRX parameter value by the Uu.

In a fifth optional implementation, for power saving mechanisms of different carrier frequencies/bands/frequency ranges, for different carrier frequencies, different DRX parameters, or a same DRX parameter but different DRX parameter values, may be used.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer).

In this implementation, in a case that a carrier frequency is a first frequency, it is determined to use a first discontinuous reception parameter; in a case that the carrier frequency is a second frequency, it is determined to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for the first frequency, and a time offset is used for the second frequency.

A DRX period is used for both the first frequency and the second frequency, but parameter values of the DRX period are different.

A DRX period and a time offset are used for the first frequency, and a time offset and a DRX activity timer are used for the second frequency.

A DRX period and a time offset are used for both the first frequency and the second frequency, but parameter values of the DRX period are different and parameter values of the time offset are also different.

A discontinuous reception parameter is sent through at least one of following signaling: an RRC signaling, a SIB message, and a pre-configuration signaling.

FIG. 4 is a schematic flowchart of a second method for processing a discontinuous reception parameter according to an implementation of the present disclosure. The method may also be performed by a network device.

As shown in FIG. 4, the method includes an act S402.

In act S402, a discontinuous reception mechanism, or a discontinuous reception parameter and a parameter value, are sent to a user equipment.

Discontinuous reception mechanisms or discontinuous reception parameters corresponding to different specific messages are different, or values of discontinuous reception parameters corresponding to different specific messages are different. Optionally, a specific message may be a PC5-S signaling or a discovery message, for example, the PC5-S signaling may be a Direct Communication Request (DCR) message.

In this implementation, a device performing the above act S402 may be a network device, which may be the network device as shown in FIG. 1, and may transmit the DRX mechanism, or the DRX parameter and the parameter value, to the user equipment. Data may be transmitted between UEs through a sidelink, and the UEs may be terminal devices as shown in FIG. 1. For a same UE, in order to meet power saving requirements for the transmission/reception of specific messages, different DRX mechanisms or DRX parameters may be set for transmission/reception of specific messages, or a same DRX parameter may be set for different specific messages but values of the DRX parameter are different.

After receiving the DRX mechanism, or the DRX parameter and parameter value, the UE may perform a configuration based on the received DRX mechanism, or DRX parameter and parameter value, so that the UE discontinuously transmits/receives data on a sidelink, thereby achieving an effect of saving power.

According to a solution provided by the above implementations of the present disclosure, by sending the discontinuous reception mechanism, or, the discontinuous reception parameter and parameter value to the user equipment, the user equipment may perform a configuration based on the received discontinuous reception mechanism, or discontinuous reception parameter and parameter value, wherein discontinuous reception mechanisms or discontinuous reception parameters corresponding to different specific messages are different, or values of discontinuous reception parameters corresponding to different specific messages are different. Compared with related technologies, for transmission/reception of specific messages, different DRX mechanisms, or DRX parameters, or parameter values may be set, so that a UE may transmit/receive data discontinuously in this scenario, thus achieving an effect of saving power, thereby solving a technical problem that a user equipment transmits data (such as a Direct Communication Request (DCR) message or a discovery message) on a sidelink in the related technologies, which consumes a large amount of power and cannot achieve a purpose of power saving.

In a sixth optional implementation, for power saving mechanisms of transmission/reception of specific messages, the transmission/reception of specific messages triggers different DRX mechanisms, or different DRX parameters, or different values of DRX parameters.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer).

In this implementation, in a case that a specific message is a first message, it is determined to use a first discontinuous reception parameter; in a case that the specific message is a second message, it is determined to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for a first message, a time offset is used for a second message, and a DRX on-duration length is used for a third message.

A DRX period is used for both the first message and the second message, but parameter values of the DRX period are different. A DRX on-duration length is used for the third message.

A DRX period and a time offset are used for the first message, a time offset and a DRX activity timer are used for the second message, and a DRX on-duration length and a time length of a retransmission timer are used for the third message.

A DRX period and a time offset are used for both the first message and the second message, but parameter values of the DRX period are different and parameter values of the time offset are also different. A DRX on-duration length is used for the third message.

A discontinuous reception parameter is sent through at least one of following signaling: an RRC signaling, a SIB message, and a pre-configuration signaling.

In the above implementation of the present disclosure, it is determined to start a first discontinuous reception timer in a case that a specific message is a first message. And/or, in a case that the specific message is a second message, it is determined to enter a discontinuous reception state. And/or, in a case that the specific message is a third message, it is determined to enter an active state.

That is, different DRX parameters/parameter values are used for different messages/directions, including:

reception or transmission of a first message starts a first DRX timer;

reception or transmission of a second message enables a UE to enter a DRX state; and reception or transmission of a third message enables the UE to enter an active state.

FIG. 5 is a schematic flowchart of a third method for processing a discontinuous reception parameter according to an implementation of the present disclosure. The method may be performed by a user equipment.

As shown in FIG. 5, the method includes acts S502 and S504. In act S502, a user equipment receives a discontinuous reception parameter and a parameter value.

In act S504, the user equipment performs a configuration based on the discontinuous reception parameter and the parameter value.

Discontinuous reception parameters corresponding to different communication parameters are different, or values of discontinuous reception parameters corresponding to different communication parameters are different.

In the above implementation of the present disclosure, a communication parameter includes at least one of following: a transmission mode, a service type, a Radio Access Technology type, an interface type, and a carrier frequency.

In this implementation, a device sending the discontinuous reception parameter and the parameter value may be a network device, which may be the network device as shown in FIG. 1, and may transmit the DRX parameter and the parameter value to the user equipment. Data may be transmitted between UEs through a sidelink, the UEs may be terminal devices as shown in FIG. 1. For a same UE, communication parameters used by the UE are different for different requirements. In order to meet power saving requirements under different requirements, different DRX parameters may be set for different communication parameters, or a same DRX parameter may be set for different communication parameters, but values of the DRX parameter are different.

After receiving the DRX parameter and parameter value, the UE may perform a configuration based on the received DRX parameter and parameter value, so that the UE discontinuously transmits/receives data on a sidelink, thereby achieving an effect of saving power.

In a first optional implementation, for power saving mechanisms under different transmission modes, for different transmission modes (broadcast, multicast, and unicast), different DRX parameters, or a same DRX parameter but different DRX parameter values, may be used.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer).

In this implementation, the user equipment performs the configuration based on the discontinuous reception parameter and the parameter value, including: in a case that a transmission mode is a first mode, it is determined to use a first discontinuous reception parameter; in a case that the transmission mode is a second mode, it is determined to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for a broadcast mode, a time offset is used for a multicast mode, and a DRX on-duration length is used for a unicast mode.

A DRX period is used for both a broadcast mode and a multicast mode, but parameter values of the DRX period are different. A DRX on-duration length is used for a unicast mode.

A DRX period and a time offset are used for a broadcast mode, a time offset and a DRX activity timer are used for a multicast mode, and a DRX on-durationlength and a time length of a retransmission timer are used for a unicast mode.

A DRX period and a time offset are used for both a broadcast mode and a multicast mode, but parameter values of the DRX period are different, and parameter values of the time offset are also different. A DRX on-duration length is used for a unicast mode.

A discontinuous reception parameter is received through at least one of following signaling: an RRC signaling, a SIB message, and a pre-configuration signaling.

In a second optional implementation, for power saving mechanisms under different service types, for different service types, different DRX parameters, or a same DRX parameter but different DRX parameter values, may be used.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer).

In this implementation, the user equipment performs the configuration based on the discontinuous reception parameter and the parameter value, including: in a case that a service type is a first type, it is determined to use a first discontinuous reception parameter; in a case that the service type is a second type, it is determined to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for the first type, and a time offset is used for the second type.

A DRX period is used for both the first type and the second type, but parameter values of the DRX period are different.

A DRX period and a time offset are used for the first type, and a time offset and a DRX activity timer are used for the second type.

A DRX period and a time offset are used for both the first type and the second type, but parameter values of the DRX period are different and parameter values of the time offset are also different.

A discontinuous reception parameter is received through at least one of following signaling: an RRC signaling, a SIB message, and a pre-configuration signaling.

In an implementation of the present disclosure, a service type is determined based on a source address, a logical channel identifier, a target address, a Provider Service Identifier (PSID), an Intelligent Transportation Systems Application Identifier (ITSAID), a service priority, a PC5 5G Quality of Service (QoS) Identifier (PC5QI, PQI), a PC5 QoS Flow Identifier (PFI), and/or a QoS attribute identifier. That is, different service types may be determined according to different target addresses, PSIDs, ITSAIDs, service priorities, PQIs, PFIs, and QoS attribute identifiers, etc. Optionally, for a PC5-S message, such as a Direct Communication Request (DCR) message, a PC5 5G Quality of Service Identifier, a PC5 Quality of Service Flow Identifier, and/or a Quality of Service attribute identifier may be determined according to a QoS set corresponding to a set of services carried on a unicast link associated with the PC5-S message. The PC5-S message is a sidelink message based on a PC5 interface.

In another optional implementation, for power saving mechanisms under different service types, for different service types, different DRX parameters, or a same DRX parameter but different DRX parameter values, may be used.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer). In this implementation, the user equipment performs the configuration based on the discontinuous reception parameter and the parameter value, including: the user equipment determines to use a first discontinuous reception parameter in a case that a service type is a first type; the user equipment determines to use a second discontinuous reception parameter in a case that the service type does not include the first type and includes a second type; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for the first type, and a time offset is used for the second type.

A DRX period is used for both the first type and the second type, but parameter values of the DRX period are different.

A DRX period and a time offset are used for the first type, and a time offset and a DRX activity timer are used for the second type.

A DRX period and a time offset are used for both the first type and the second type, but parameter values of the DRX period are different and parameter values of the time offset are also different.

A discontinuous reception parameter is received through at least one of following signaling: an RRC signaling, a SIB message, and a pre-configuration signaling.

In an implementation of the present disclosure, a service type is determined based on a source address, a logical channel identifier, a target address, a Provider Service Identifier (PSID), an Intelligent Transportation Systems Application Identifier (ITSAID), a service priority, a PC5 5G Quality of Service (QoS) Identifier (PC5QI, PQI), a PC5 QoS Flow Identifier (PFI), and/or a QoS attribute identifier. That is, different service types may be determined according to different target addresses, PSIDs, ITSAIDs, service priorities, PQIs, PFIs, and QoS attribute identifiers, etc. Optionally, for a PC5-S message, such as a Direct Communication Request (DCR) message, a PC5 5G Quality of Service Identifier, a PC5 Quality of Service Flow Identifier, and/or a Quality of Service attribute identifier may be determined according to a QoS set corresponding to a set of services carried on a unicast link associated with the PC5-S message. The PC5-S message is a sidelink message based on a PC5 interface.

In another optional implementation, the service type refers to a service type associated with a service carried on a unicast communication link.

In a third optional implementation, for power saving mechanisms under different RAT types, for different RAT types, different DRX parameters, or a same DRX parameter but different DRX parameter values, may be used.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer).

In this implementation, the user equipment performs the configuration based on the discontinuous reception parameter and the parameter value, including: in a case that a RAT type is a first type, it is determined to use a first discontinuous reception parameter; in a case that the RAT type is a second type, it is determined to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for LTE and a time offset is used for NR.

A DRX period is used for both LTE and NR, but parameter values of the DRX period are different.

A DRX period and a time offset are used for LTE, and a time offset and a DRX activity timer are used for NR.

A DRX period and a time offset are used for both LTE and NR, but parameter values of the DRX period are different and parameter values of the time offset are also different.

A discontinuous reception parameter is received through at least one of following signaling: an RRC signaling, a SIB message, and a pre-configuration signaling.

A RAT type includes: LTE and NR, or different releases of LTE/NR.

In a fourth optional implementation, for power saving mechanisms under different interface types, for different interface types, different DRX parameters, or a same DRX parameter but different DRX parameter values, may be used.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer). In this implementation, the user equipment performs the configuration based on the discontinuous reception parameter and the parameter value, including: in a case that an interface type is a first type, it is determined to use a first discontinuous reception parameter; in a case that the interface type is a second type, it is determined to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for a Uu interface and a time offset is used for a PC5 interface.

A DRX period is used for both a Uu interface and a PC5 interface, but parameter values for the DRX period are different.

A DRX period and a time offset are used for a Uu interface, and a time offset and a DRX activity timer are used for a PC5 interface.

A DRX period and a time offset are used for both a Uu interface and a PC5 interface, but parameter values of the DRX period are different and parameter values of the time offset are also different.

A discontinuous reception parameter is received through at least one of following signaling: an RRC signaling, a SIB message, and a pre-configuration signaling.

An interface type includes: a Uu interface and a PC5 interface.

For different interface types, different DRX parameters, or a same DRX parameter but different DRX parameter values, are used, including: a user equipment reports a first parameter, wherein, the first parameter is used for determining a value of a discontinuous reception parameter corresponding to a PC5 interface. That is, a network device receives a first parameter reported by a UE, calculates a PC5 DRX parameter value based on the first parameter, and returns the calculated PC5 DRX parameter value to the UE.

The first parameter includes at least one piece of following information of the UE: identity information of the UE, transmission mode information, source address information, PQI, PFI, and QoS attribute information, etc.

After receiving a value of a discontinuous reception parameter corresponding to a user equipment interface, the user equipment determines a value of a discontinuous reception parameter corresponding to a PC5 interface based on the value of the discontinuous reception parameter corresponding to the user equipment interface. That is, a network delivers only a first DRX parameter value used by a Uu, and a UE deduces a second DRX parameter value used by a PC5 according to the first DRX parameter value used by the Uu.

In a fifth optional implementation, for power saving mechanisms of different carrier frequencies/bands/frequency ranges, for different carrier frequencies, different DRX parameters, or a same DRX parameter but different DRX parameter values, may be used.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer).

In this implementation, the user equipment performs the configuration based on the discontinuous reception parameter and the parameter value, including: in a case that a carrier frequency is a first frequency, the user equipment determines to use a first discontinuous reception parameter; in a case that the carrier frequency is a second frequency, the user equipment determines to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for the first frequency, and a time offset is used for the second frequency.

A DRX period is used for both the first frequency and the second frequency, but parameter values of the DRX period are different.

A DRX period and a time offset are used for the first frequency, and a time offset and a DRX activity timer are used for the second frequency.

A DRX period and a time offset are used for both the first frequency and the second frequency, but parameter values of the DRX period are different and parameter values of the time offset are also different.

A discontinuous reception parameter is received through at least one of following signaling: an RRC signaling, a SIB message, and a pre-configuration signaling.

FIG. 6 is a schematic flowchart of a fourth method for processing a discontinuous reception parameter according to an implementation of the present disclosure. The method may be performed by a user equipment.

As shown in FIG. 6, the method includes acts S602 and S604.

In act S602, a user equipment receives a discontinuous reception mechanism, or a discontinuous reception parameter and a parameter value.

In act S604, the user equipment performs a configuration based on the discontinuous reception mechanism, or the discontinuous reception parameter and the parameter value.

Discontinuous reception mechanisms or discontinuous reception parameters corresponding to different specific messages are different, or values of discontinuous reception parameters corresponding to different specific messages are different.

In this implementation, a device sending the discontinuous reception mechanism, or the discontinuous reception parameter and the parameter value, may be a network device, which may be the network device as shown in FIG. 1, and may transmit the DRX mechanism, or the DRX parameter and the parameter value to the user equipment. Data may be transmitted between UEs through a sidelink, and the UEs may be terminal devices as shown in FIG. 1. For a same UE, in order to meet power saving requirements for the transmission/reception of specific messages, different DRX mechanisms or DRX parameters may be set for transmission/reception of specific messages, or a same DRX parameter may be set for different specific messages but values of the DRX parameter are different.

After receiving the DRX mechanism, or the DRX parameter and parameter value, the UE may perform a configuration based on the received DRX mechanism, or DRX parameter and parameter value, so that the UE discontinuously transmits/receives data on a sidelink, thereby achieving an effect of saving power.

In a sixth optional implementation, for power saving mechanisms of transmission/reception of specific messages, the transmission/reception of specific messages triggers different DRX mechanisms, or different DRX parameters, or different values of DRX parameters.

A discontinuous reception parameter includes at least one of following: a DRX period, a time offset, a length of DRX on-duration (ondurationtimer), a length of a DRX activity timer (inactivitytimer), and a time length of a retransmission timer (retransmissiontimer).

In this implementation, the user equipment performs the configuration based on the discontinuous reception mechanism, or the discontinuous reception parameter and the parameter value, including: in a case that a specific message is a first message, it is determined to use a first discontinuous reception parameter; in a case that the specific message is a second message, it is determined to use a second discontinuous reception parameter; wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

The following is a detailed description in combination with following examples.

A DRX period is used for a first message, a time offset is used for a second message, and a DRX on-duration length is used for a third message.

A DRX period is used for both the first message and the second message, but parameter values of the DRX period are different. A DRX on-duration length is used for the third message.

A DRX period and a time offset are used for the first message, a time offset and a DRX activity timer are used for the second message, and a DRX on-duration length and a time length of a retransmission timer are used for the third message.

A DRX period and a time offset are used for both the first message and the second message, but parameter values of the DRX period are different and parameter values of the time offset are also different. A DRX on-duration length is used for the third message.

A discontinuous reception parameter is received through at least one of following signaling: an RRC signaling, a SIB message, and a pre-configuration signaling.

In the above implementation of the present disclosure, the user equipment performs the configuration based on the discontinuous reception mechanism, or the discontinuous reception parameter and the parameter value, including: the user equipment determines to start a first discontinuous reception timer in a case that a specific message is a first message. And/or, the user equipment performs the configuration based on the discontinuous reception mechanism, or the discontinuous reception parameter and the parameter value, including: the user equipment determines to enter a discontinuous reception state in a case that a specific message is a second message. And/or, the user equipment performs the configuration based on the discontinuous reception mechanism, or the discontinuous reception parameter and the parameter value, including: the user equipment determines to enter an active state in a case that a specific message is a first message.

That is, different DRX parameters/parameter values are used for different messages/directions, including: reception or transmission of a first message starts a first DRX timer;

reception or transmission of a second message enables a UE to enter a DRX state; and reception or transmission of a third message enables the UE to enter an active state.

It should be understood that in various implementations of the present disclosure, sequence numbers of various processes do not imply an order of execution of the various processes, which should be determined by their functions and internal logics, but should not constitute any limitation on implementation processes of the implementations of the present disclosure.

The method for processing a discontinuous reception parameter according to the implementations of the present disclosure is described in detail above with reference to FIG. 1 to FIG. 6. A terminal device and a network device according to the implementations of the present disclosure will be described below with reference to FIG. 7 to FIG. 9.

As shown in FIG. 7, a network device 700 according to an implementation of the present disclosure includes a communication module 702.

In an optional implementation, the communication module 702 is configured to send a discontinuous reception parameter and a parameter value to a user equipment; wherein discontinuous reception parameters corresponding to different communication parameters are different, or values of discontinuous reception parameters corresponding to different communication parameters are different.

Optionally, as an implementation, the communication module 702 is further configured to receive a first parameter reported by the user equipment, wherein the first parameter is used for determining a value of a discontinuous reception parameter corresponding to a PC5 interface.

Optionally, as an implementation, the communication module 702 is further configured to send a value of a discontinuous reception parameter corresponding to a user equipment interface to the user equipment, wherein the user equipment is configured to determine a value of a discontinuous reception parameter corresponding to a PC5 interface based on the value of the discontinuous reception parameter corresponding to the user equipment interface.

In another optional implementation, the communication module 702 is configured to send a discontinuous reception mechanism, or a discontinuous reception parameter and a parameter value, to the user equipment; wherein discontinuous reception mechanisms or discontinuous reception parameters corresponding to different specific messages are different, or values of discontinuous reception parameters corresponding to different specific messages are different.

It should be understood that the above and other operations and/or functions of various modules in the network device 700 according to an implementation of the present disclosure are respectively for implementing corresponding processes of network devices in FIG. 3 and FIG. 4, and will not be repeated here for brevity.

Figure 8:
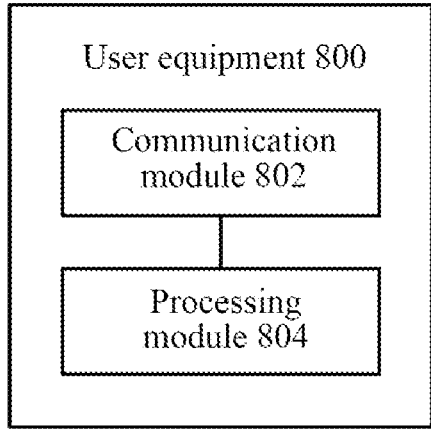
FIG. 8 is a schematic diagram of a user equipment according to an implementation of the present disclosure.

As shown in FIG. 8, a user equipment 800 according to an implementation of the present disclosure includes a communication module 802 and a processing module 804.

In an optional implementation, the communication module 802 is configured to receive a discontinuous reception parameter and a parameter value, wherein discontinuous reception parameters corresponding to different communication parameters are different, or values of discontinuous reception parameters corresponding to different communication parameters are different; and the processing module 804 is configured to perform a configuration based on the discontinuous reception parameter and the parameter value.

Optionally, as an implementation, a communication parameter includes: a transmission mode. The processing module 804 is further configured to determine to use a first discontinuous reception parameter in a case that the transmission mode is a first mode; and determine to use a second discontinuous reception parameter in a case that the transmission mode is a second mode. Wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

Optionally, as an implementation, the communication parameter includes: a service type. The processing module 804 is further configured to determine to use a first discontinuous reception parameter in a case that the service type is a first type; and determine to use a second discontinuous reception parameter in a case that the service type is a second type. Wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

Optionally, as an implementation, the communication parameter includes: a RAT type. The processing module 804 is further configured to determine to use a first discontinuous reception parameter in a case that the RAT type is a first type; and determine to use a second discontinuous reception parameter in a case that the RAT type is a second type. Wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

Optionally, as an implementation, the communication parameter includes: an interface type. The processing module 804 is further configured to determine to use a first discontinuous reception parameter in a case that the interface type is a first type; and determine to use a second discontinuous reception parameter in a case that the interface type is a second type. Wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

Optionally, as an implementation, the communication module 802 is further configured to report a first parameter, wherein the first parameter is used for determining a value of a discontinuous reception parameter corresponding to a PC5 interface.

Optionally, as an implementation, the processing module 804 is further configured to determine a value of a discontinuous reception parameter corresponding to a PC5 interface based on a value of a discontinuous reception parameter corresponding to a user equipment interface after receiving the value of the discontinuous reception parameter corresponding to the user equipment interface.

Optionally, as an implementation, the communication parameter includes: a carrier frequency. The processing module 804 is further configured to determine to use a first discontinuous reception parameter in a case that the carrier frequency is a first frequency; and determine to use a second discontinuous reception parameter in a case that the carrier frequency is a second frequency. Wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

In another optional implementation, the communication module 802 is further configured to receive a discontinuous reception mechanism, or a discontinuous reception parameter and a parameter value, wherein discontinuous reception mechanisms or discontinuous reception parameters corresponding to different specific messages are different, or values of discontinuous reception parameters corresponding to different specific messages are different; and the processing module 804 is configured to perform a configuration based on the discontinuous reception mechanism, or the discontinuous reception parameter and the parameter value.

Optionally, as an implementation, the processing module 804 is further configured to determine to start a first discontinuous reception timer in a case that a specific message is a first message. Optionally, the first message may be a PC5-S signaling or a discovery message, for example, the PC5-S signaling may be a Direct Communication Request (DCR) message.

Optionally, as an implementation, the processing module 804 is further configured to determine to enter a discontinuous reception state in a case that a specific message is a second message.

Optionally, as an implementation, the processing module 804 is further configured to determine to enter an active state in a case that a specific message is a first message.

Optionally, as an implementation, the processing module 804 is further configured to determine to use a first discontinuous reception parameter in a case that a specific message is a first message; and determine to use a second discontinuous reception parameter in a case that the specific message is a second message. Wherein parameters included in the first discontinuous reception parameters are at least partially different or all different from parameters included in the second discontinuous reception parameters, or values of parameters included in the first discontinuous reception parameters are at least partially different or all different from values of parameters included in the second discontinuous reception parameters.

It should be understood that the above and other operations and/or functions of various modules in the user equipment 800 according to an implementation of the present disclosure are respectively for implementing corresponding processes of the user equipment in various methods in FIG. 5 to FIG. 6, and will not be repeated here for brevity.

An implementation of the present disclosure also provides a storage medium, which includes a stored program, wherein, when the program is running, a device where the storage medium is located is controlled to perform each method of processing a discontinuous reception parameter in the implementations of the present disclosure.

An implementation of the present disclosure also provides a processor, which is configured to run a program, wherein, when the program is running, each method of processing a discontinuous reception parameter in the implementations of the present disclosure is performed.

Figure 9:
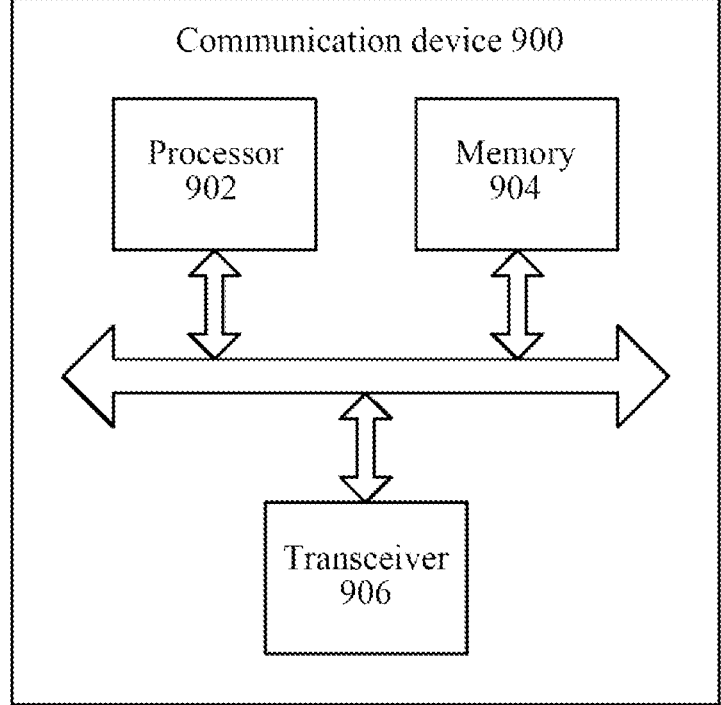
FIG. 9 is a schematic diagram of a communication device according to an implementation of the present disclosure.

FIG. 9 is a schematic diagram of a structure of a communication device 900 according to an implementation of the present disclosure. The communication device 900 shown in FIG. 9 includes a processor 902 which may call and run a computer program from a memory to implement the methods in the implementations of the present disclosure.

Optionally, as shown in FIG. 9, the communication device 900 may further include a memory 904. The processor 902 may call and run a computer program from the memory 904 to implement the methods in the implementations of the present disclosure.

The memory 904 may be a separate device independent of the processor 902, or may be integrated in the processor 902.

Optionally, as shown in FIG. 9, the communication device 900 may further include a transceiver 906, and the processor 902 may control the transceiver 906 to communicate with another device. Specifically, the transceiver 1330 may send information or data to another device or receive information or data sent by another device.

The transceiver 906 may include a transmitter and a receiver. The transceiver 906 may further include antennas, a quantity of which may be one or more.

Optionally, the communication device 900 may specifically be the network device according to the implementations of the present disclosure, and the communication device 900 may implement corresponding processes implemented by the network device in various methods in the implementations of the present disclosure, which will not be repeated here for brevity.

Optionally, the communication device 900 may specifically be the user equipment according to the implementations of the present disclosure, and the communication device 900 may implement corresponding processes implemented by the user equipment in various methods in the implementations of the present disclosure, which will not be repeated here for brevity.

Figure 10:
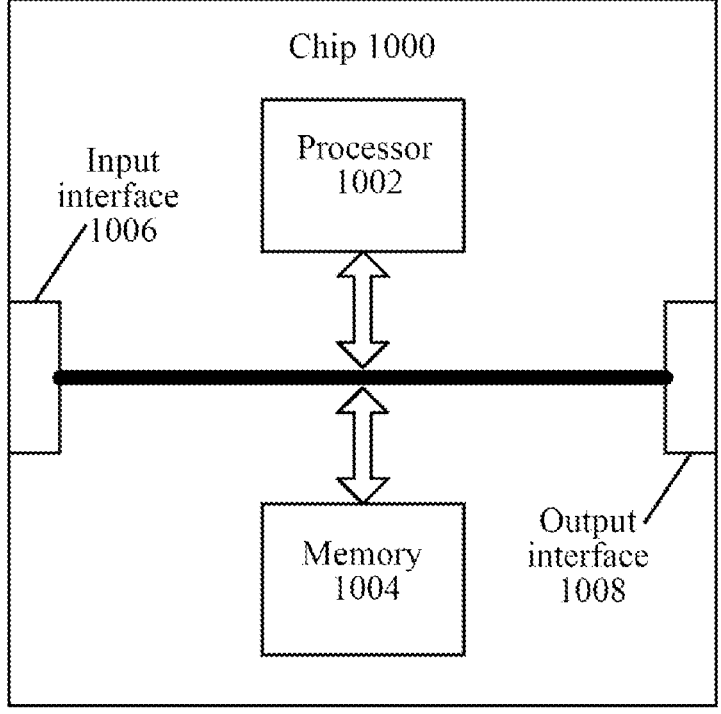
FIG. 10 is a schematic diagram of a chip according to an implementation of the present disclosure.

FIG. 10 is a schematic diagram of a structure of a chip according to an implementation of the present disclosure. The chip 1000 shown in FIG. 10 includes a processor 1002, wherein the processor 1002 may call and run a computer program from a memory to implement the methods in the implementations of the present disclosure.

Optionally, as shown in FIG. 10, the chip 1000 may further include a memory 1004. The processor 1002 may call and run a computer program from the memory 1004 to implement the methods in the implementations of the present disclosure.

The memory 1004 may be a separate device independent of the processor 1002, or may be integrated in the processor 1002.

Optionally, the chip 1000 may further include an input interface 1006. The processor 1002 may control the input interface 1006 to communicate with another device or chip. Specifically, the processor 1410 may acquire information or data sent by another device or chip.

Optionally, the chip 1000 may further include an output interface 1008. The processor 1002 may control the output interface 1008 to communicate with another device or chip. Specifically, the processor 1410 may output information or data to another device or chip.

Optionally, the chip may be applied to the network device in the implementations of the present disclosure, and the chip may implement the corresponding processes implemented by the network device in the various methods of the implementations of the present disclosure, which will not be repeated here for brevity.

Optionally, the chip may be applied to the user equipment in the implementations of the present disclosure, and the chip may implement the corresponding processes implemented by the user equipment in various methods of the implementations of the present disclosure, which will not be repeated here for brevity.

It should be understood that the chip mentioned in the implementations of the present disclosure may also be referred to as a system-level chip, a system chip, a chip system, or a system on chip, etc.

Figure 11:
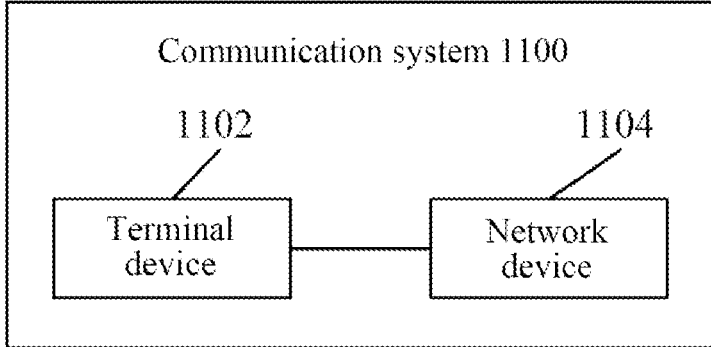
FIG. 11 is a schematic diagram of a communication system according to an implementation of the present disclosure.

FIG. 11 is a schematic block diagram of a communication system 1100 according to an implementation of the present disclosure. As shown in FIG. 11, the communication system 1100 includes a terminal device 1102 and a network device 1104.

The terminal device 1102 may be configured to implement corresponding functions implemented by the user equipment in the above-mentioned methods, and the network device 1104 may be configured to implement corresponding functions implemented by the network device in the above-mentioned methods, which will not be repeated here for brevity.

It should be understood that the processor in the implementations of the present disclosure may be an integrated circuit chip with a capability for processing signals. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or transistor logic device, or a discrete hardware component. The processor may implement various methods, acts, and logic block diagrams disclosed in the implementations of the present disclosure. The general purpose processor may be a microprocessor or the processor may be any conventional processor or the like. The acts of the methods disclosed in connection with the implementations of the present disclosure may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in a memory, and a processor reads information in the memory and completes the acts of the above methods in combination with its hardware.

It should be understood that the memory in the implementations of the present disclosure may be a transitory memory or a non-transitory memory, or may include both transitory and non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memories are examples for illustration but should not be construed as limitations. For example, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), etc. That is to say, the memories in the implementations of the present disclosure are intended to include, but are not limited to, these and any other suitable types of memories.

An implementation of the present disclosure further provides a computer readable storage medium, configured to store a computer program.

Optionally, the computer readable storage medium may be applied to a network device in an implementation of the present disclosure, and the computer program enables a computer to perform corresponding processes implemented by the network device in various methods according to the implementations of the present disclosure, which will not be repeated here for brevity.

Optionally, the computer readable storage medium may be applied to the user equipment in the implementations of the present disclosure, and the computer program enables a computer to perform the corresponding processes implemented by the user equipment in various methods according to the implementations of the present disclosure, which will not be repeated here for brevity.

An implementation of the present disclosure further provides a computer program product, including computer program instructions.

Optionally, the computer program product may be applied to the network device in the implementations of the present disclosure, and the computer program instructions enable a computer to perform corresponding processes implemented by the network device in various methods according to the implementations of the present disclosure, which will not be repeated here for brevity.

Optionally, the computer program product may be applied to the user equipment in the implementations of the present disclosure, and the computer program instructions enable the computer to perform the corresponding processes implemented by the user equipment in various methods according to the implementations of the present disclosure, which will not be repeated here for brevity.

An implementation of the present disclosure further provides a computer program.

Optionally, the computer program may be applied to the network device in the implementations of the present disclosure. When the computer program is run on a computer, the computer is enabled to perform corresponding processes implemented by the network device in various methods according to the implementations of the present disclosure, which will not be repeated here for brevity.

Optionally, the computer program may be applied to the user equipment in the implementations of the present disclosure, and when the computer program is run on a computer, the computer is enabled to perform corresponding processes implemented by the user equipment in various methods according to the implementations of the present disclosure, which will not be repeated here for brevity.

Those of ordinary skills in the art will recognize that units and algorithm acts of various examples described in connection with the implementations disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each specific application, but such implementation should not be considered to be beyond the scope of the present disclosure.

Those skilled in the art may clearly understand that for convenience and conciseness of description, specific working processes of the systems, apparatuses, and units described above may refer to corresponding processes in the aforementioned method implementations, and details will not be repeated here.

In several implementations according to the present disclosure, it should be understood that the disclosed systems, apparatuses, and methods may be implemented in other ways. For example, the apparatus implementations described above are only exemplary. For example, a division of the units is only a division of logical functions, but there may be other division manners in actual implementations. For example, multiple units or components may be combined or integrated into another system, or some features may be ignored or not executed.

In addition, mutual coupling or direct coupling or communication connection shown or discussed may be indirect coupling or communication connection between apparatuses or units through some interfaces, and may be in electrical, mechanical, or in other forms.

The units described as separated components may or may not be physically separated, and components shown as units may or may not be physical units, i.e., they may be located in one place or may be distributed over multiple network units. Some or all of the units may be selected according to practical needs to achieve purposes of solutions of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on such understanding, the technical solutions of the present disclosure, in essence, or parts of them which contribute to the prior art, or parts of the technical solutions, may be embodied in a form of a software product, which is stored in a storage medium, and includes several instructions for enabling a computer device (which may be a personal computer, a server, or a network device, etc.) to perform all or part of the acts of the methods of various implementations of the present disclosure. And the aforementioned storage medium includes various media, such as a U disk, a mobile hard disk, a Read-Only Memory (ROM), a Random Access Memory (RAM), a magnetic disk, or an optical disk, etc., which may store program codes.

The foregoing are merely specific implementations of the present disclosure, but the protection scope of the present disclosure is not limited thereto. Any person skilled in the art may readily conceive variations or substitutions within the technical scope disclosed by the present disclosure, which should be included within the protection scope of the present disclosure. Therefore, the protection scope of the present disclosure shall be subject to the protection scope of the claims.

The invention claimed is:

1. A method for processing a discontinuous reception parameter, comprising:
   receiving, by a user equipment, a discontinuous reception parameter and a parameter value, wherein discontinuous reception parameters corresponding to different communication parameters are different, or values of discontinuous reception parameters corresponding to different communication parameters are different;
   performing, by the user equipment, a configuration based on the discontinuous reception parameter and the parameter value;
   wherein the communication parameters comprise a transmission mode of a sidelink and a service type; and the service type corresponds to a service priority and a PC5 5G Quality of Service Identifier;
   the method further comprising:
   transmitting, by the user equipment, data through the sidelink according to the configuration.

2. The method of claim 1, wherein the discontinuous reception parameter comprises at least one of: a discontinuous reception period, a time offset, a length of discontinuous reception on-duration, a length of a discontinuous reception activity timer, and a time length of a retransmission timer.

3. The method of claim 2, wherein the communication parameters comprise: the transmission mode of the sidelink;
   performing, by the user equipment, the configuration based on the discontinuous reception parameter and the parameter value, comprises:
   determining, by the user equipment, to use a first discontinuous reception parameter in a case that the transmission mode is a first mode; and
   determining, by the user equipment, to use a second discontinuous reception parameter in a case that the transmission mode is a second mode;
   wherein parameters contained in first discontinuous reception parameters are at least partially different from parameters contained in second discontinuous reception parameters.

4. The method of claim 2, wherein the communication parameters comprise: the service type;
   performing, by the user equipment, the configuration based on the discontinuous reception parameter and the parameter value, comprises:
   determining, by the user equipment, to use a first discontinuous reception parameter in a case that the service type is a first type; and
   determining, by the user equipment, to use a second discontinuous reception parameter in a case that the service type is a second type;
   wherein values of parameters contained in first discontinuous reception parameters are at least partially different from values of parameters contained in second discontinuous reception parameters.

5. The method of claim 2, wherein the communication parameters further comprise: an interface type;
   performing, by the user equipment, the configuration based on the discontinuous reception parameter and the parameter value, comprises:
   determining, by the user equipment, to use a first discontinuous reception parameter in a case that the interface type is a first type; and
   determining, by the user equipment, to use a second discontinuous reception parameter in a case that the interface type is a second type;
   wherein parameters contained in first discontinuous reception parameters are at least partially different from parameters contained in second discontinuous reception parameters, or values of parameters contained in first discontinuous reception parameters are at least partially different or all different from values of parameters contained in second discontinuous reception parameters.

6. The method of claim 5, wherein the interface type comprises a Uu interface and a PC5 interface.

7. The method of claim 6, further comprising one of following:

reporting, by the user equipment, a first parameter, wherein the first parameter is used for determining a value of a discontinuous reception parameter corresponding to the PC5 interface.

8. The method of claim 7, wherein the first parameter comprises at least one piece of following information of the user equipment: source address information, a PC5 5G Quality of Service Identifier.

9. The method of claim 1, wherein the discontinuous reception parameter is received through at least one of following signaling: a Radio Resource Control signaling, a System Information Block message, and a pre-configuration signaling.

10. A user equipment, comprising a processor and a transceiver, wherein the transceiver is configured to receive a discontinuous reception parameter and a parameter value, wherein discontinuous reception parameters corresponding to different communication parameters are different, or values of discontinuous reception parameters corresponding to different communication parameters are different;

the processor is configured to perform a configuration based on the discontinuous reception parameter and the parameter value;

wherein the communication parameters comprise a transmission mode of a sidelink and a service type; and the service type corresponds to a service priority and a PC5 5G Quality of Service Identifier;

the transceiver is further configured to transmit data through the sidelink according to the configuration.

* * * * *